(12) United States Patent
Heidari et al.

(10) Patent No.: US 8,799,146 B2
(45) Date of Patent: Aug. 5, 2014

(54) METHODS FOR POST-TRADE ALLOCATION

(71) Applicants: Massoud Heidari, New York, NY (US); Ali Hirsa, New York, NY (US)

(72) Inventors: Massoud Heidari, New York, NY (US); Ali Hirsa, New York, NY (US)

( * ) Notice: Subject to any disclaimer, the term of this patent is extended or adjusted under 35 U.S.C. 154(b) by 0 days.

(21) Appl. No.: 14/103,585

(22) Filed: Dec. 11, 2013

(65) Prior Publication Data

US 2014/0101021 A1   Apr. 10, 2014

Related U.S. Application Data

(63) Continuation of application No. 13/178,026, filed on Jul. 7, 2011, now abandoned.

(51) Int. Cl.
*G06Q 40/00*  (2012.01)
(52) U.S. Cl.
USPC ............... 705/37; 705/36 R; 705/39; 705/35; 705/41; 705/1.1

(58) Field of Classification Search
USPC .................. 705/1.1, 37, 36 R, 39, 35, 30, 41; 725/114; 709/228, 226
See application file for complete search history.

(56) References Cited

U.S. PATENT DOCUMENTS 7,512,555 B2 * 3/2009 Finn ................................ 705/35
2007/0244788 A1 * 10/2007 Ferris .......................... 705/36 R

* cited by examiner

*Primary Examiner* — John H Holly
(74) *Attorney, Agent, or Firm* — Ditthavong & Steiner, P.C.

(57) ABSTRACT

A computer-implemented method for providing an allocation of a filled order made at a particular time, that involves receiving at least a price of a filled order made at a later time; generating a starting allocation across multiple managed accounts based at least in part on allocation factors of each of the multiple managed accounts; generating at least one additional allocation based at least in part on the starting allocation; determining a closest-fitting allocation according to a metric from amongst the starting allocation and the at least one additional allocation, the metric being based at least in part on the price of the filled order made at the later time and on a price of the filled order made at the particular time; and outputting the closest-fitting allocation.

22 Claims, 20 Drawing Sheets

$N$: number of managed accounts $\alpha_i$: allocation factor for account $i$, that is, $\alpha_i = \frac{AUM_i}{\sum_{i=1}^{N} AUM_i}$ where $AUM_i$ is asset under management for account $i$ $NP_t$: portfolio (system) net position at time $t$ $NP_t^i$: account $i$ net position at time $t$ $PL_t$: total cumulative (aggregated) realized P&L at time $t$ $PL_t^i$: account $i$ cumulative (aggregated) realized P&L at time $t$ $q_t$: quantity of filled order (buy or sell) at time $t$ $q_t^i$: rounded allocation of quantity $q_t$ for managed account $i$ at time $t$ $p_t$: price of the filled order at time $t$ where $t$ is the time for the last filled order. Without loss of generality assume time $t-1$ was the time for the filled order prior to the last filled order.

$$NP_t = NP_{t-1} + q_t$$
$$NP_t^i = NP_{t-1}^i + q_t^i$$
$$q_t = \sum_{i=1}^{N} q_t^i$$
$$PL_t = PL_{t-1} + NP_{t-1} \times (p_t - p_{t-1})$$
$$PL_t^i = PL_{t-1}^i + NP_{t-1}^i \times (p_t - p_{t-1})$$
$$= PL_{t-1}^i + (NP_{t-2}^i + q_{t-1}^i) \times (p_t - p_{t-1})$$
$$var(NP_t) = \sum_{i=1}^{N} \sum_{j=i+1}^{N} (NP_t^i - NP_t^j)^2$$
$$Q = \sum_{i=1}^{N} \left( \frac{PL_t^i}{\alpha_i} - PL_t \right)^2$$

FIG. 4

$sgn = sign(NP_{t-1})$ $tmp_i = \alpha_i \times NP_{t-1}$ for all $i$ $tmp_i = round(tmp_i)$ for all $i$ while $\sum_{i=1}^{N} tmp_i \neq |NP_{t-1}|$ let $\iota$ be index for the maximum of $tmp = [tmp_1, \ldots, tmp_N]$ if more than one index, then pick one if $\sum_{i=1}^{N} tmp_i > |NP_{t-1}|$ $tmp_\iota = tmp_\iota - 1$ else if $\sum_{i=1}^{N} tmp_i < |NP_{t-1}|$ $tmp_\iota = tmp_\iota + 1$ end-if end-while $\widehat{NP}_{t-1}^{i} = sgn \times tmp_i$ Then the estimated allocation for each managed account is $\widehat{q}_{t-1}^{i} = \widehat{NP}_{t-1}^{i} - NP_{t-2}^{i}$.

FIG. 7 if buying $q_{t-1}$ contracts and there is negative $\hat{q}^i_{t-1}$ for some $i$, then set $NP^i_{t-1} = NP^i_{t-2}$ while $\sum_{i=1}^{N} \left(NP^i_{t-1} - NP^i_{t-2}\right) \neq q_{t-1}$
        $y^i = NP^i_{t-1} - NP^i_{t-2}$
        let $j$ be the index for the maximum of $y$
        then do the following adjustment $NP^j_{t-1} = NP^j_{t-1} - 1$
    end if selling $q_{t-1}$ contracts and there is positive $\hat{q}^i_{t-1}$ for some $i$, then set $NP^i_{t-1} = NP^i_{t-2}$ while $\sum_{i=1}^{N} \left(NP^i_{t-1} - NP^i_{t-2}\right) \neq q_{t-1}$
        $y^i = NP^i_{t-1} - NP^i_{t-2}$
        let $j$ be the index for the minimum of $y$
        then do the following adjustment $NP^j_{t-1} = NP^j_{t-1} + 1$
    end Then $q^i_{t-1} = NP^i_{t-1} - NP^i_{t-2}$ is a (legitimate) allocation

FIG. 8 if $N \geq 2$ (two or more managed accounts) use the following pairs:
$[a_1 \ a_2] = [+1 \ -1]$, $[a_1 \ a_2] = [+2 \ -2]$, and $[a_1 \ a_2] = [+3 \ -3]$ for $i = 1, \ldots, N$ for $j = 1, \ldots, N$ if $i \neq j$ $NP^i_{t-1} = NP^i_{t-1} + a_1$ $NP^j_{t-1} = NP^j_{t-1} + a_2$ if $NP^i_{t-1} \geq 0$ for all $i$ first do sanity check (pseudo-code provided earlier)

and then calculate $Q$ if $Q_{new} < Q_{previous}$ save the allocation $q^i_{t-1} = NP^i_{t-1} - NP^i_{t-2}$ else if $Q_{new} = Q_{previous}$ pick the allocation that has a smaller $var(NP_{t-1})$ end-if end-if end-if end-if end-for

FIG. 9A if $N \geq 3$ (three or more managed accounts) use the following triplets: $[a_1 \; a_2 \; a_3] = [+2 \; -1 \; -1]$, $[a_1 \; a_2 \; a_3] = [-2 \; +1 \; +1]$, $[a_1 \; a_2 \; a_3] = [+3 \; -2 \; -1]$, and $[a_1 \; a_2 \; a_3] = [-3 \; +2 \; +1]$ for $i = 1, \ldots, N$ for $j = 1, \ldots, N$ for $k = 1, \ldots, N$ if $i \neq j$ and $i \neq k$ and $j \neq k$ $NP^i_{t-1} = NP^i_{t-1} + a_1$ $NP^j_{t-1} = NP^j_{t-1} + a_2$ $NP^k_{t-1} = NP^k_{t-1} + a_3$ if $NP^\iota_{t-1} \geq 0$ for all $\iota$ first do sanity check (pseudo-code provided earlier)

and then calculate $Q$ if $Q_{new} < Q_{previous}$ save the allocation $q^i_{t-1} = NP^i_{t-1} - NP^i_{t-2}$ else if $Q_{new} = Q_{previous}$ pick the allocation that has a smaller $var(NP_{t-1})$ end-if end-if end-if end-for end-for end-for

FIG. 9B if $N \geq 4$ (four or more managed accounts) use the following quadruplets:
$[a_1\ a_2\ a_3\ a_4] = [+1\ -1\ +1\ -1]$ for $i = 1, \ldots, N$ for $j = 1, \ldots, N$ for $k = 1, \ldots, N$ for $l = 1, \ldots, N$ if $i \neq j$ and $i \neq k$ and $i \neq l$ and $j \neq k$ and $j \neq l$ and $k \neq l$ $$NP_{t-1}^i = NP_{t-1}^i + a_1$$

$$NP_{t-1}^j = NP_{t-1}^j + a_2$$

$$NP_{t-1}^k = NP_{t-1}^k + a_3$$

$$NP_{t-1}^l = NP_{t-1}^l + a_4$$

if $NP_{t-1}^\iota \geq 0$ for all $\iota$ first do sanity check (pseudo-code provided earlier)

and then calculate $Q$ if $Q_{new} < Q_{previous}$ save the allocation $q_{t-1}^i = NP_{t-1}^i - NP_{t-2}^i$ else if $Q_{new} = Q_{previous}$ pick the allocation that has a smaller $var(NP_{t-1})$ end-if end-if end-for end-for end-for end-for

FIG. 9C

All filled orders for Bund

| time | Buy | Sell | net position | price | last period p&l | cumulative p&l |
|---|---|---|---|---|---|---|
| 2:5:4:612 | 15 | - | 15 | 121.17 | 0 | 0 |
| 2:5:4:628 | 7 | - | 22 | 121.17 | 0 | 0 |
| 2:5:28:191 | 7 | - | 29 | 121.16 | -308 | -308 |
| 2:20:28:442 | 1 | - | 30 | 121.18 | 812 | 504 |
| 2:21:56:567 | 3 | - | 33 | 121.17 | -420 | 84 |
| 2:50:14:5 | - | 2 | 31 | 121.17 | 0 | 84 |
| 2:51:24:729 | - | 7 | 24 | 121.18 | 434 | 518 |
| 2:51:32:620 | - | 2 | 22 | 121.19 | 336 | 854 |
| 3:5:13:33 | - | 5 | 17 | 121.28 | 2772 | 3626 |
| 3:5:13:49 | - | 10 | 7 | 121.28 | 0 | 3626 |
| 3:5:14:471 | - | 5 | 2 | 121.29 | 98 | 3724 |
| 3:20:2:971 | - | 6 | -4 | 121.35 | 168 | 3892 |
| 3:21:23:721 | - | 14 | -18 | 121.36 | -56 | 3836 |
| 3:21:44:830 | - | 6 | -24 | 121.37 | -252 | 3584 |
| 3:35:3:650 | - | 9 | -33 | 121.51 | -4704 | -1120 |
| 3:35:21:276 | - | 18 | -51 | 121.52 | -462 | -1582 |
| 3:38:7:198 | - | 9 | -60 | 121.53 | -714 | -2296 |
| 3:50:3:371 | 9 | - | -51 | 121.43 | 8400 | 6104 |
| 3:50:3:402 | 19 | - | -32 | 121.43 | 0 | 6104 |
| 3:54:5:886 | 9 | - | -23 | 121.42 | 448 | 6552 |
| 4:5:3:837 | 2 | - | -21 | 121.42 | 0 | 6552 |
| 4:5:35:978 | 7 | - | -14 | 121.41 | 294 | 6846 |
| 4:20:13:216 | - | 1 | -15 | 121.4 | 196 | 7042 |
| 4:20:21:794 | - | 3 | -18 | 121.41 | -210 | 6832 |
| 4:22:34:732 | - | 1 | -19 | 121.42 | -252 | 6580 |
| 4:35:14:560 | - | 4 | -23 | 121.44 | -532 | 6048 |
| 4:36:32:419 | - | 11 | -34 | 121.45 | -322 | 5726 |
| 4:36:48:372 | - | 4 | -38 | 121.46 | -476 | 5250 |
| 4:50:2:904 | - | 4 | -42 | 121.52 | -3192 | 2058 |
| 4:54:9:779 | - | 11 | -53 | 121.53 | -588 | 1470 |
| 4:57:25:622 | - | 4 | -57 | 121.54 | -742 | 728 |
| 5:5:3:482 | 3 | - | -54 | 121.53 | 798 | 1526 |
| 5:5:3:513 | 7 | - | -47 | 121.53 | 0 | 1526 |
| 5:7:26:722 | 3 | - | -44 | 121.52 | 658 | 2184 |
| 5:20:3:165 | - | 7 | -51 | 121.55 | -1848 | 336 |
| 5:20:3:197 | - | 3 | -54 | 121.55 | 0 | 336 |
| 5:20:50:900 | - | 3 | -57 | 121.56 | -756 | -420 |
| 5:35:3:403 | 8 | - | -49 | 121.54 | 1596 | 1176 |
| 5:35:3:418 | 4 | - | -45 | 121.54 | 0 | 1176 |
| 5:36:11:90 | 4 | - | -41 | 121.53 | 630 | 1806 |
| 5:50:3:43 | 6 | - | -35 | 121.5 | 1722 | 3528 |
| 5:58:41:606 | 14 | - | -21 | 121.49 | 490 | 4018 |
| 5:59:29:403 | 6 | - | -15 | 121.48 | 294 | 4312 |
| 6:5:2:856 | 5 | - | -10 | 121.46 | 420 | 4732 |
| 6:5:2:872 | 2 | - | -8 | 121.46 | 0 | 4732 |
| 6:5:36:637 | 2 | - | -6 | 121.45 | 112 | 4844 |
| 6:20:3:590 | - | 3 | -9 | 121.48 | -252 | 4592 |
| 6:20:16:950 | - | 7 | -16 | 121.49 | -126 | 4466 |
| 6:20:55:122 | - | 3 | -19 | 121.5 | -224 | 4242 |
| 6:35:6:825 | - | 7 | -26 | 121.55 | -1330 | 2912 |
| 6:35:19:981 | - | 14 | -40 | 121.56 | -364 | 2548 |
| 6:41:30:903 | - | 7 | -47 | 121.57 | -560 | 1988 |
| 6:50:3:226 | 3 | - | -44 | 121.54 | 1974 | 3962 |
| 6:50:5:602 | 8 | - | -36 | 121.53 | 616 | 4578 |
| 6:50:38:107 | 3 | - | -33 | 121.52 | 504 | 5082 |
| 7:5:3:209 | - | 3 | -36 | 121.55 | -1386 | 3696 |
| 7:6:9:584 | - | 8 | -44 | 121.56 | -504 | 3192 |
| 7:20:3:351 | 5 | - | -39 | 121.54 | 1232 | 4424 |
| 7:24:11:116 | 11 | - | -28 | 121.53 | 546 | 4970 |
| 7:35:3:116 | - | 2 | -30 | 121.54 | -392 | 4578 |
| 7:46:13:148 | - | 4 | -34 | 121.55 | -420 | 4158 |
| 7:46:15:491 | - | 2 | -36 | 121.56 | -476 | 3682 |
| 8:5:2:960 | - | 2 | -38 | 121.55 | 504 | 4186 |
| 8:20:2:991 | - | 4 | -42 | 121.6 | -2660 | 1526 |
| 8:20:22:116 | - | 11 | -53 | 121.61 | -588 | 938 |
| 8:35:2:913 | 6 | - | -47 | 121.59 | 1484 | 2422 |
| 8:35:2:945 | 12 | - | -35 | 121.59 | 0 | 2422 |
| 8:39:48:195 | 6 | - | -29 | 121.58 | 490 | 2912 |
| 8:50:3:70 | - | 5 | -34 | 121.64 | -2436 | 476 |
| 8:50:7:382 | - | 13 | -47 | 121.65 | -476 | 0 |
| 8:56:10:507 | - | 5 | -52 | 121.66 | -658 | -658 |
| 9:5:3:132 | - | 6 | -58 | 121.98 | -23296 | -23954 |
| 9:5:3:820 | - | 14 | -72 | 121.99 | -812 | -24766 |
| 9:11:51:959 | - | 6 | -78 | 122 | -1008 | -25774 |
| 9:20:3:57 | 3 | - | -75 | 121.98 | 2184 | -23590 |
| 9:35:3:292 | - | 1 | -76 | 122.11 | -13650 | -37240 |
| 9:35:27:386 | - | 2 | -78 | 122.12 | -1064 | -38304 |
| 9:35:28:511 | - | 1 | -79 | 122.13 | -1092 | -39396 |
| 9:50:3:526 | 4 | - | -75 | 122.07 | 6636 | -32760 |
| 9:50:6:479 | 10 | - | -65 | 122.06 | 1050 | -31710 |
| 9:50:16:839 | 4 | - | -61 | 122.05 | 910 | -30800 |

FIG. 10A

All filled orders for Bund (cont'd)

| \multicolumn{6}{c}{System(Portfolio)} |
|---|---|---|---|---|---|
| time | Buy | Sell | net position | price | last period p&l | cumulative p&l |
| 10:5:3:776 | 7 | - | -54 | 122.01 | 3416 | -27384 |
| 10:5:3:776 | 3 | - | -51 | 122.01 | 0 | -27384 |
| 10:20:22:895 | - | 1 | -52 | 122.03 | -1428 | -28812 |
| 10:35:2:876 | - | 6 | -58 | 122.19 | -11648 | -40460 |
| 10:35:2:876 | - | 14 | -72 | 122.19 | 0 | -40460 |
| 10:35:2:923 | - | 6 | -78 | 122.19 | 0 | -40460 |
| 11:5:12:173 | - | 2 | -80 | 122.52 | -36036 | -76496 |
| 11:20:3:407 | 3 | - | -77 | 122.49 | 3360 | -73136 |
| 11:20:7:188 | 7 | - | -70 | 122.48 | 1078 | -72058 |
| 11:20:28:501 | 3 | - | -67 | 122.47 | 980 | -71078 |
| 11:35:3:849 | 3 | - | -64 | 122.42 | 4690 | -66388 |
| 11:35:7:880 | 9 | - | -55 | 122.41 | 896 | -65492 |
| 11:36:12:180 | 3 | - | -52 | 122.4 | 770 | -64722 |
| 11:50:3:209 | 8 | - | -44 | 122.36 | 2912 | -61810 |
| 11:50:3:224 | 3 | - | -41 | 122.36 | 0 | -61810 |
| 11:50:27:740 | 3 | - | -38 | 122.35 | 574 | -61236 |
| 12:5:22:730 | - | 3 | -41 | 122.41 | -3192 | -64428 |
| 12:20:14:439 | - | 1 | -42 | 122.39 | 1148 | -63280 |
| 12:20:14:455 | - | 4 | -46 | 122.39 | 0 | -63280 |
| 12:20:38:736 | - | 1 | -47 | 122.4 | -644 | -63924 |
| 12:35:3:59 | - | 3 | -50 | 122.43 | -1974 | -65898 |
| 12:35:3:59 | - | 1 | -51 | 122.43 | 0 | -65898 |
| 12:50:25:598 | 1 | - | -50 | 122.41 | 1428 | -64470 |
| 12:50:25:613 | 3 | - | -47 | 122.41 | 0 | -64470 |
| 13:0:14:570 | 1 | - | -46 | 122.4 | 658 | -63812 |
| 13:5:13:635 | 3 | - | -43 | 122.4 | 0 | -63812 |
| 13:5:13:635 | 6 | - | -37 | 122.4 | 0 | -63812 |
| 13:20:25:969 | - | 5 | -42 | 122.47 | -3626 | -67438 |
| 13:21:2:750 | - | 13 | -55 | 122.48 | -588 | -68026 |
| 13:22:24:79 | - | 5 | -60 | 122.49 | -770 | -68796 |
| 13:35:14:443 | 2 | - | -58 | 122.46 | 2520 | -66276 |
| 13:36:11:803 | 7 | - | -51 | 122.45 | 812 | -65464 |
| 13:50:27:261 | 3 | - | -48 | 122.45 | 0 | -65464 |
| 13:50:27:261 | 9 | - | -39 | 122.45 | 0 | -65464 |
| 13:53:47:716 | 3 | - | -36 | 122.44 | 546 | -64918 |
| 14:5:3:361 | 14 | - | -22 | 122.42 | 1008 | -63910 |
| 14:5:3:376 | 6 | - | -16 | 122.42 | 0 | -63910 |
| 14:6:50:190 | 6 | - | -10 | 122.41 | 224 | -63686 |
| 14:24:47:759 | 1 | - | -9 | 122.44 | -420 | -64106 |
| 14:35:14:497 | 1 | - | -8 | 122.45 | -126 | -64232 |
| 14:50:14:394 | - | 2 | -10 | 122.49 | -448 | -64680 |
| 14:50:14:425 | - | 7 | -17 | 122.49 | 0 | -64680 |
| 15:6:13:837 | - | 3 | -20 | 122.49 | 0 | -64680 |
| 15:20:3:202 | 5 | - | -15 | 122.42 | 1960 | -62720 |
| 15:20:3:218 | 11 | - | -4 | 122.42 | 0 | -62720 |
| 15:35:3:817 | 1 | - | -3 | 122.43 | -56 | -62776 |
| 15:35:3:833 | 4 | - | 1 | 122.43 | 0 | -62776 |
| 15:50:3:417 | - | 1 | 0 | 122.44 | 14 | -62762 |
| 15:54:15:559 | - | 2 | -2 | 122.45 | 0 | -62762 |

FIG. 10B

FIG. 11A  Allocation across three managed accounts with allocation factor %37.02, %31.63, %31.35

FIG. 11B  Allocation across three managed accounts with allocation factor %37.02, %31.63, %31.35

METHODS FOR POST-TRADE ALLOCATION

CROSS REFERENCE TO RELATED APPLICATIONS

This application is a continuation of U.S. application Ser. No. 13/178,026 filed Jul. 7, 2011, the entirety of which is incorporated herein.

FIELD OF THE INVENTION

The present invention relates in general to the post-trade allocation of trades between multiple accounts, and specifically to a method for nonbiased allocation of trades.

BACKGROUND OF THE INVENTION

Exchanges do not allow for fractional contract sizes. As a result, allocation of block trades between different accounts requires rounding of positions, which can result in biased allocations. The recognition of average prices can lessen the amount of bias to some degree. However, not all exchanges recognize average prices such as EUREX. Alternative allocation procedures that have been suggested for exchanges that do not recognize average prices can result in a biased allocation between trades. These alternative allocation procedures do not guarantee convergence towards the respective accounts' appropriate allocated portion of the returns, regardless of the number of separately managed accounts, even when the number of filled orders grows sufficiently large. One such methodology which fails to necessarily converge or guarantee a fair outcome is the "High Account High Price" methodology. Accordingly, there is a need for alternative allocation methods that are more equitable and that do not suffer from these drawbacks.

SUMMARY OF THE INVENTION

The present invention provides a computerized method for reducing bias in allocation of trades. This method can be applied, without limitation, to trades over all exchanges. While this method is particularly effective in reducing, or eliminating (to the extent that rounding allows) bias in such exchanges as EUREX that do not recognize average prices, it can also be applied for trades over exchanges that do recognize average prices. The present method reduces bias by computing, in a processor of an electronic computing device (including without limitation a desktop computer, a laptop, a server, or a mobile device, or other electronic systems and devices), and thereby ensuring, a trade allocation that is "fair and optimal," by which it is meant that cumulative profit and loss are divided amongst accounts according to their relative account allocation factors, to the maximum extent that rounding permits. According to the method, gross trading returns for each account will converge towards that account's appropriate allocated portion of the returns, regardless of the number of separately managed accounts, as the number of filled orders grows sufficiently large (i.e., as will happen over a period such as a day, a week, or a subscription redemption period). Embodiments of the method further ensure that the separately managed accounts have a net position which is: i) in each case greater than or equal to zero, or ii) in each case less than or equal to zero. That is, that they all have the same sign. Embodiments of the method guarantee other results, including i) guaranteeing that if the last, or any, filled order of the day flattens a portfolio, then all managed accounts get flattened as well ii) guaranteeing that if the system was flat immediately prior to the last filled order of the day, that the last filled order of the day is allocated according to the accounts' respective allocation factors (again, to the extent that rounding permits); and iii) otherwise, that the allocation across all managed accounts is fair and optimal (again, to the extent that rounding permits). The method computes, for purposes including, but not limited to, ultimately communicating to the holders of the managed accounts their respective profits and losses, trades across the managed accounts which may be electronically represented, without limitation, as a vector of integers of like sign.

BRIEF DESCRIPTION OF THE DRAWINGS

Further features and advantages of the invention may be understood by reviewing the following detailed description of the preferred embodiments of the invention taken together with the attached drawings, in which:

FIG. 4 shows a number of definitions, equations and formulas useful to one of ordinary skill in the art in carrying out the present invention and in understanding the subject matter thereof.

FIG. 7 shows exemplary pseudocode, which may be implemented in any of a variety of computer programming languages or computer applications, for generating an estimated allocation for each managed account;

FIG. 8 shows exemplary pseudocode, such as may be implemented in any of a variety of computer programming languages or computer applications, for performing a "sanity check adjustment," as described in this specification, and for generating an allocation considered to be "legitimate;"

FIGS. 9A-9C show pseudocode, such as may be implemented in any of a variety of computer programming languages or computer applications, for generating a number of perturbations of, for example, a "legitimate" starting allocation, and determining the closest-fitting of these perturbations according to a metric, wherein the operations represented by these figures are preferably performed in sequence;

FIGS. 10A-10B show an exemplary table containing examples of filled orders for a portfolio for Bunds on Monday Apr. 18, 2011;

FIGS. 11A-11B show a table containing allocations of the filled orders of FIGS. 10A-10B across three managed accounts which would occur according to an embodiment of the present invention; and

DETAILED DESCRIPTION OF THE PREFERRED EMBODIMENTS

Figure 1:
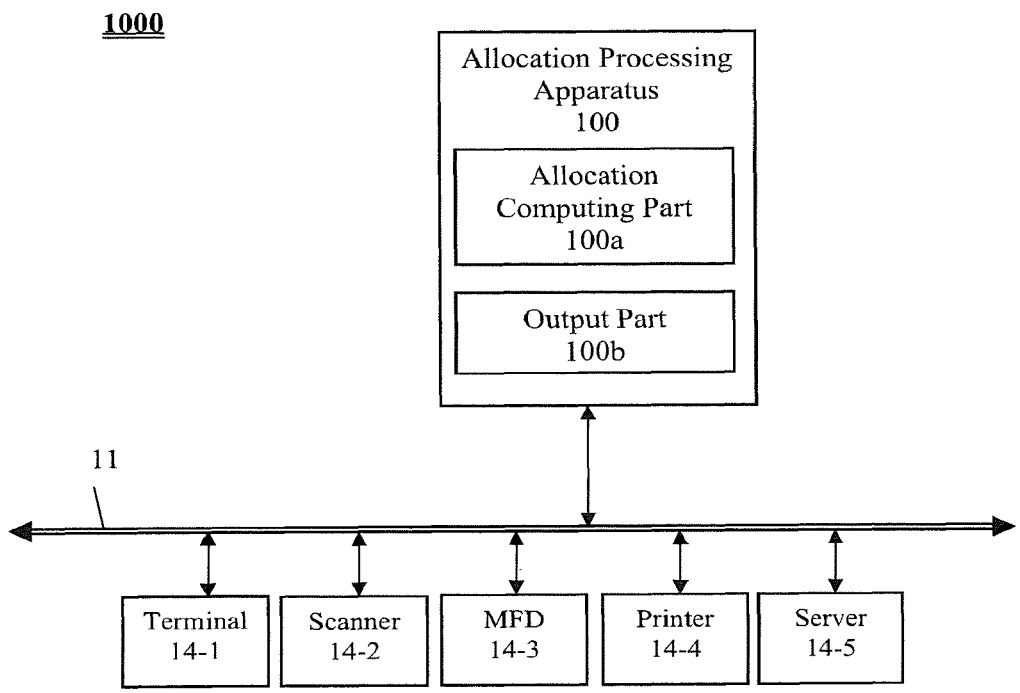
FIGS. 1-1C show a variety of embodiments of computer systems having allocation computing parts, which computer systems may be used to carry out the method of the present invention.

FIG. 1 includes one allocation processing apparatus 100 with an allocation computing part 100*a* and output part 100*b*, as well as five other network devices 14-1 through 14-5 connected to a network 11. The network 11 can include one or more of a secure intranet or extranet local area network, a wide area network (WAN), any type of network that allows secure access, or a combination thereof. Further, other secure communications links (such as a virtual private network, a wireless link) may be used as well as the network connections. In addition, the allocation processing apparatus 100 may be connected to a network that employs TCP/IP (Transmission Control Protocol/Internet Protocol), but other protocols such as SNMP (Simple Network Management Protocol) and HTTP (Hypertext Transfer Protocol) can also be used. How devices can connect to and communicate over the networks is well-known in the art and is discussed for example, in "How Networks Work", by Frank J_Derfler, Jr. and Les Freed (Que Corporation 2000) and "How Computers Work", by Ron White, (Que Corporation 1999), the entire contents of each of which are incorporated herein by reference.

It should be appreciated that such numbers and types of other network devices, terminals and apparatuses are arbitrary and are selected as an example in order to facilitate discussion, and that the subject matter of this disclosure can be implemented in a system including one or more systems, servers, apparatuses and terminals. Other devices, such as other scanners, printers and multi-function devices may also be connected to a network, as is well known in the art. Further, the network devices, allocation processing apparatus 100, allocation computing part 100*a* and output part 100*b* may be connected in a different network arrangement to that depicted in FIG. 1A.

The allocation processing apparatus 100 of the present invention may be realized by a computer program product including a computer-usable, non-transient medium (such as a disk storage apparatus) having instructions tangibly embodied therein that are executed by a computer. Thus, it should be understood that the allocation processing apparatus 100 may be executed on a computer. The allocation processing apparatus may be executed on a client terminal and/or network-connected device. The functionalities of the allocation computing part 100*a* may be provided by a software application such as a programmable application (e.g., Microsoft Excel), a dedicated financial software application, another application, an operating system (OS), firmware, operating on a terminal and/or network-connected device.

The allocation processing apparatus 100 may include a data storage system that can comprise one or more structural or functional parts that have or support a storage function. For example, the data store can be, or can be a component of, a source of electronic data, such as a document or financial data access apparatus, a backend server connected to a document or financial data access apparatus, an e-mail server, a file server, a multi-function peripheral device (MFP or MFD), an application server, a computer, a network apparatus, or a terminal. It should be appreciated that the term "electronic document" or "electronic data", as used herein, in its broadest sense, can comprise any data that a user may wish to access, retrieve, review, or otherwise use.

Allocation processing apparatus 100 is not limited to a computer or server, but can be manifested in any of various devices that can be configured to communicate over a network and/or the Internet, including but not limited to a personal, notebook or workstation computer, a terminal, a kiosk, a PDA (personal digital assistant), a tablet computing device, a smartphone, a server, a mobile phone or handset, or another information terminal. Each device may be configured with software allowing the device to communicate through networks with other devices. It should be understood that the allocation processing apparatus 100 may be the device that is actually performing, with its output part 100*b* outputting the output job (e.g. an e-mail, a transmission to separate financial software, a printer or automated call-in system, a display on a screen, or other electronic action making beneficial use of the calculated allocation), or the allocation processing apparatus may be connected via the network 11 to another device (such as MFD 14-3 or printer 14-4) that is performing the output job. Similarly, it should be understood that one or more of the processing functions described above as being performed by the processing part 100*a* may instead be performed by another device connected to the allocation processing apparatus 100 via the network 11, such as terminal 14-1, MFD 14-3 or server 14-5.

Figure 1A:
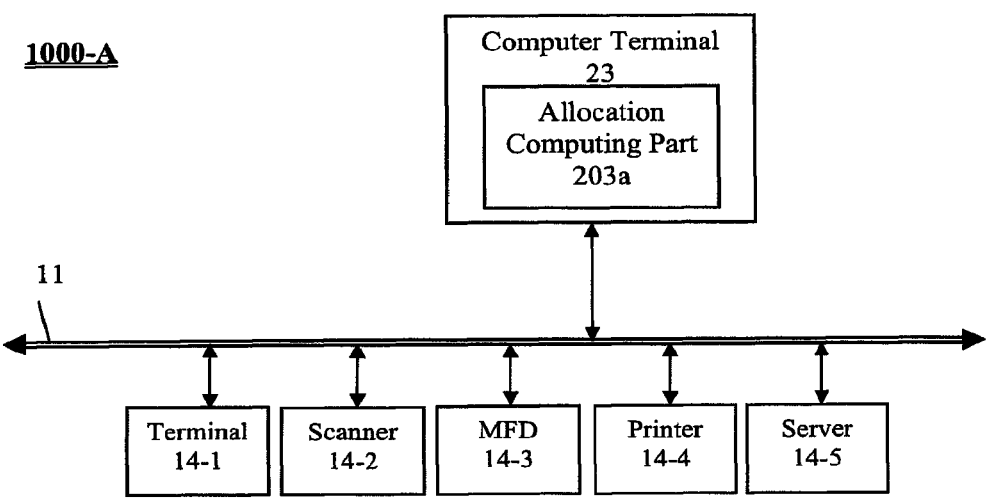
Figure 1B:
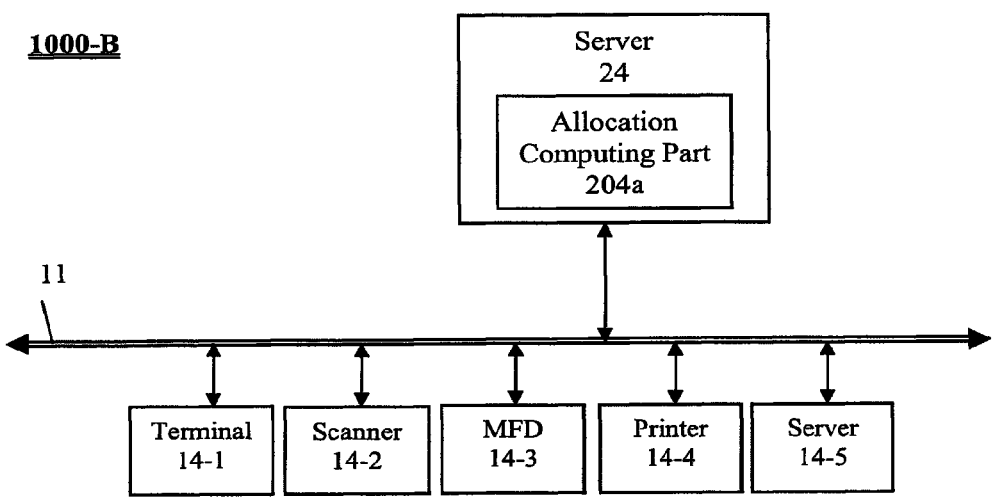
Figure 1C:
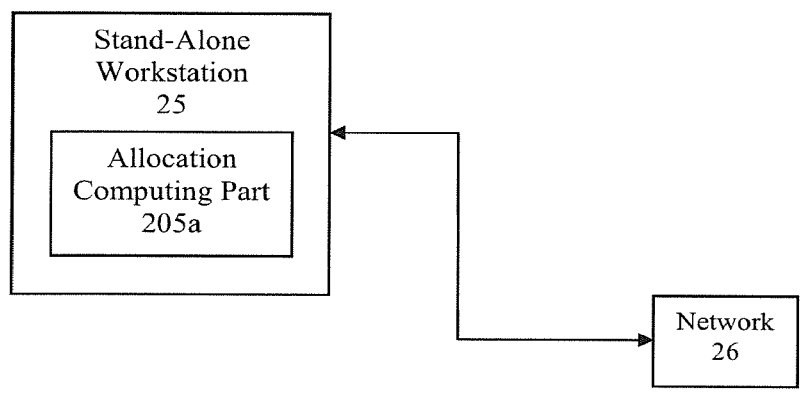

FIG. 1A shows one embodiment where the allocation computing part 203*a* is included as part of a computer terminal 23 connected to exemplary network 11. FIG. 1B shows another embodiment where the allocation computing part 204*a* is included as part of a server 24 also connected to an exemplary network 11. FIG. 1C shows a further embodiment where the allocation computing part 205*a* is part of a stand-alone workstation 25 connected to a network 26 which may take any of the variety of forms, which are readily known in the art. Again, FIGS. 1-1A are merely indicative of the breadth of such arrangement of electronics, computers and computing devices, which may be used to carry out the inventive methods disclosed herein and are not intended to limit those to which the invention may be applied.

Figure 2:
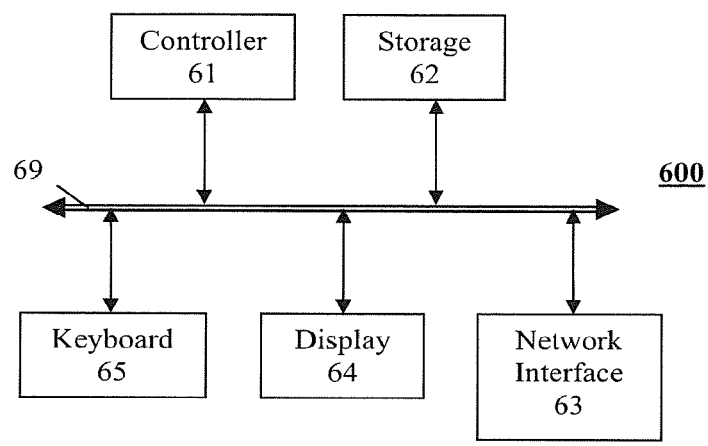
FIG. 2 shows a further example computer system which may be used to carry out the methods of the present invention.

FIG. 2 shows an exemplary arrangement of an allocation processing apparatus as a computer, for example, that can be configured through software to provide the allocation processing apparatus 100 illustrated in FIG. 1. As shown in FIG. 2, the allocation processing apparatus 600 includes a controller (or central processing unit) 61 that communicates with a number of other components, including memory or storage part 62, network interface 63, display 64 and keyboard 65, by way of a system bus 69.

The allocation processing apparatus 600 may be a special-purpose device (such as including one or more application specific integrated circuits or an appropriate network of conventional component circuits) or it may be software-configured on a conventional personal computer or computer workstation with sufficient memory, processing and communication capabilities to operate as a terminal and/or server, as will be appreciated to those skilled in the relevant arts.

In allocation processing apparatus 600, the controller 61 executes program code instructions that control device operations. The controller 61, memory/storage 62, network interface 63, display 64 and keyboard 65 are conventional, and therefore in order to avoid occluding the inventive aspects of this disclosure, such conventional aspects will not be discussed in detail herein.

The allocation processing apparatus 600 includes the network interface 63 for communications with other devices through a network. However, it should be appreciated that the subject matter of this disclosure is not limited to such configuration. For example, the allocation processing apparatus 600 may communicate with client and/or other terminals through direct connections and/or through a network to which some components are not connected. As another example, the allocation processing apparatus 600 need not be provided by a server that services terminals, but rather may communicate with the devices on a peer basis, or in another fashion.

In one embodiment, allocation processing apparatus 100 may be manifested as a multi-function device, which may be any apparatus (including a microprocessor chip or a collection of devices having varying degrees of integration) that has the ability to perform two or more functionalities. The multi-function device may be a terminal or any computing device including but not limited to a personal, notebook or workstation computer, a kiosk, a PDA (personal digital assistant), a tablet computing device, a smartphone, a server, a mobile phone or handset, or another information terminal.

Figure 3:
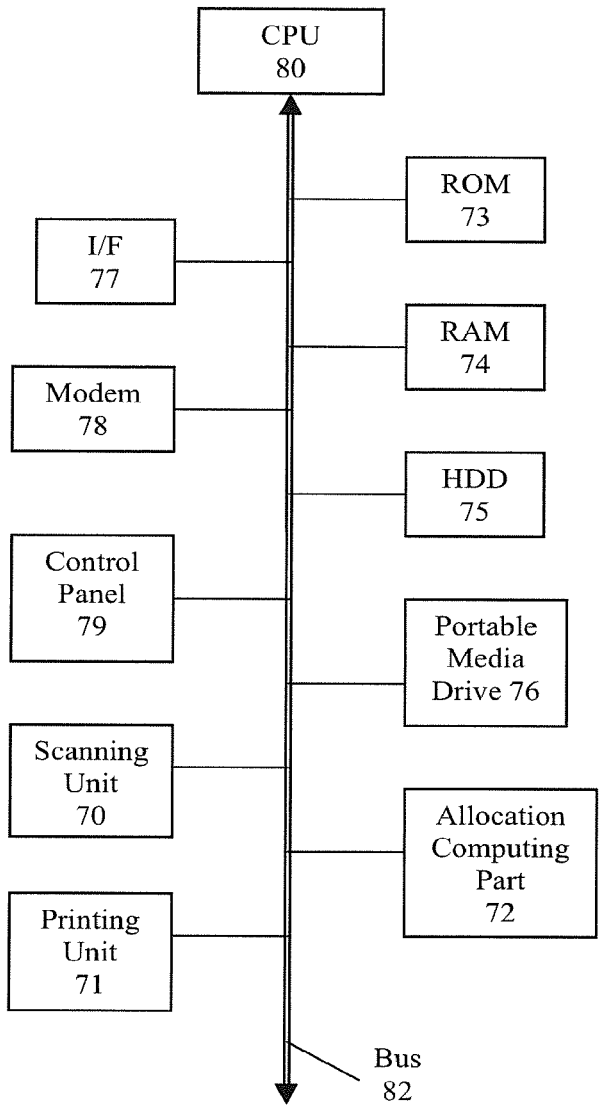
FIG. 3 shows yet another example computer system which may also be used to carry out the methods of the present invention.

An example of a configuration of a multi-function device is shown schematically in FIG. 3. Device 700 includes a central processing unit (CPU) 80, and various elements connected to the CPU 80 by an internal bus 82. The CPU 80 services multiple tasks while monitoring the state of the device 700. The elements connected to the CPU 80 include a scanning unit 70, a printing unit 71, an allocation computing part 72, a read only memory (for example, ROM, PROM, EPROM, or EEPROM) 73, a random access memory (RAM) 74, a hard disk drive (HDD) 75, portable media (for example, floppy disk, optical disc, magnetic discs, magneto-optical discs, or semiconductor memory cards) drive 76, a communication interface (I/F) 77, a modem unit 78, and a control panel 79.

Program code instructions for the device 700 can be stored on the read only memory 73, on the HDD 75, or on portable media and read by the portable media drive 76, transferred to the RAM 74 and executed by the CPU 80 to carry out the instructions. These instructions can include the instructions to the device to perform specified ones of its functions and permit the device 700 to interact with other network devices, and to control the operation panel 79 and the allocation computing part 72 of the device 700. The control panel 79 includes a display screen that displays information allowing the user of the device 700 to operate the device 700, and optionally to display as output an allocation determined by the allocation computing part 72. The display screen can be any of various conventional displays (such as a liquid crystal display, a plasma display device, or a cathode ray tube display), but preferably allows the operator to conveniently take advantage of the services provided by the system. The display screen does not need to be integral with, or embedded in, the operation panel 79, but may simply be coupled to the operation panel by either a wire or a wireless connection. The operation panel 79 may include keys for inputting information or requesting various operations. Alternatively, the operation panel 79 and the display screen may be operated by a keyboard, a mouse, a remote control, touching the display screen, voice recognition, or eye-movement tracking, or a combination thereof. The device 700 is a multifunction device (with scanner, printer and allocation computing) and in addition can be utilized as a terminal to download documents or financial information from a network.

Additional aspects or components of the device 700 are conventional (unless otherwise discussed herein), and in the interest of clarity and brevity are not discussed in detail herein. Such aspects and components are discussed, for example, in "How Computers Work," by Ron White (Que Corporation 1999), and "How Networks Work," by Frank J. Derfler, Jr. and Les Freed (Que Corporation 2000), the entire contents of each of which are incorporated herein by reference.

Figure 11B:
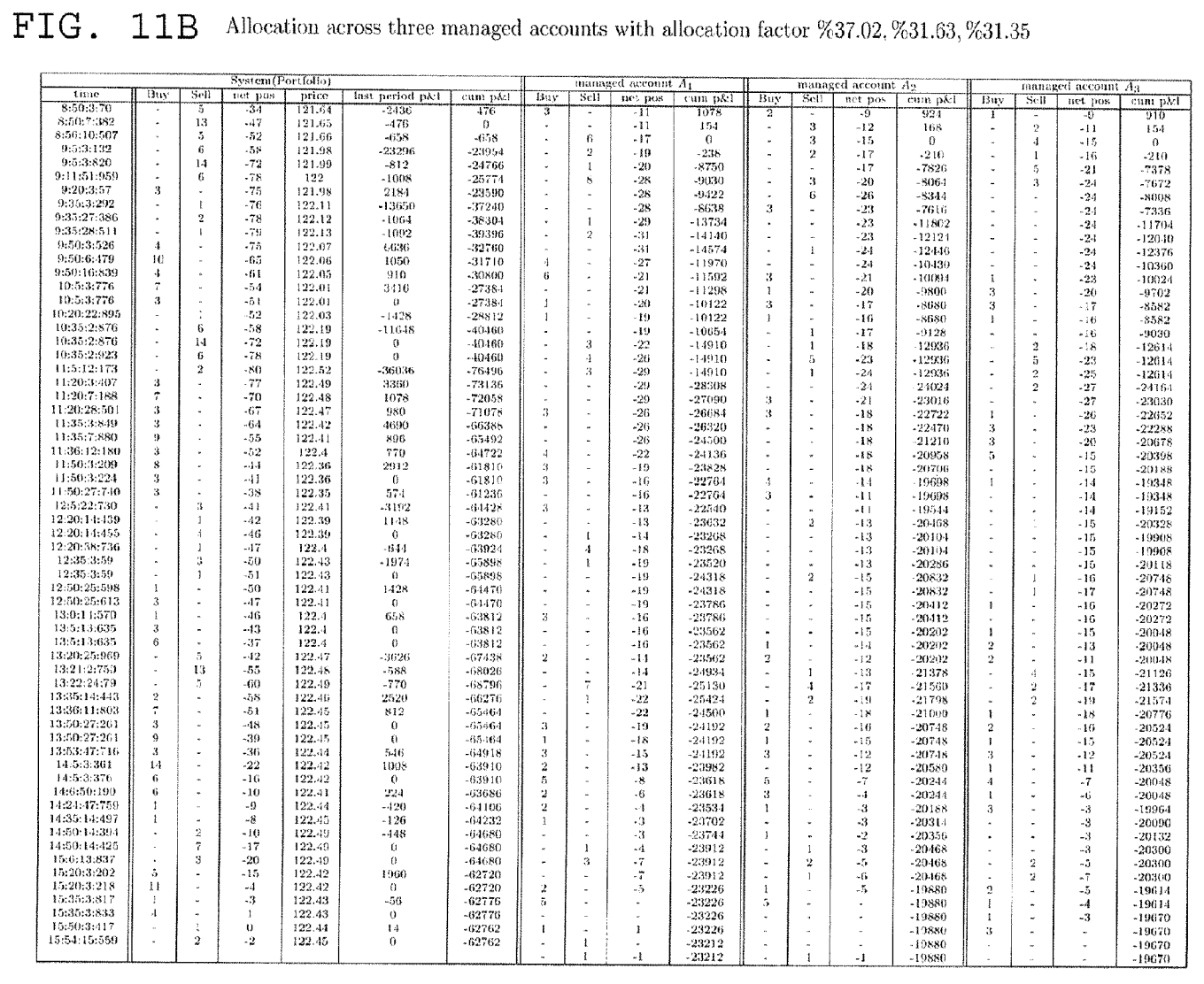

FIG. 4 shows a number of definitions and formulas that will be used in the description of the various methods of the invention. The invention is intended to generate a fair allocation of the trades filled for a portfolio by a time t−1, amongst N managed accounts. N can be any counting number. For example, in FIGS. 11A-11B, N is 3. Each of these N accounts have an allocation factor $\alpha$ representing the portion of the portfolio optimally attributable to that account. For example, in FIGS. 11A-11B the account allocation factors are 37.02%, 31.63%, and 31.35%. The portfolio, at any given e, has a net position, as do the individual accounts, as shown for example in the 4 "net pos" columns of FIGS. 11A-11B. Additionally, both the portfolio and the individual accounts have a total cumulative realized profit and loss at any given time, as shown for example in the "cum p&l" columns of FIGS. 11A-B. The cumulative realized profit and Loss may be calculated for any period (such as daily, weekly, or for each subscription/redemption period). At any time, there is a quantity q of filled order, for either a buy or a sell, for the portfolio. This can be seen for example in the "Buy" and "Sell" columns of FIGS. 10A-B or the leftmost "Buy" and "Sell" columns of FIGS. 11A-B. One of ordinary skill in the art will understand that it is not necessary to separately track buys and sells within a computer program or process, such as with separate storage variables, but that both may be tracked for example with a single integer which may be positive for buys and negative for sells. There is also a quantity of filled order for each of the N managed accounts at any given time, which is that account's rounded allocation of the filled order of the portfolio as a whole. An important aspect of the present invention, which will be discussed in the specification in depth, is the manner in which it calculates this quantity for each of the individual managed accounts. At any given time there is also a price of the filled order, which price is used in a number of computations according to embodiments of the present invention.

Preferably, the calculation is made, at or after time t (the time of the most recent filled order) to determine a fair allocation of a filled order made at time t−1, that is, the time of the filled order prior to the most recent filled order. However, one of ordinary skill in the art will understand that, while assigning times in this fashion and performing the calculations at these times is preferable, the present invention is intended to include such trivial or nontrivial modifications to the assignments of particular times as: i) assigning additional times between filled orders (and perhaps performing additional unnecessary calculations), at which times there is effectively a filled order of 0 buys or 0 sells; or ii) combining multiple filled orders into a single transaction at some time (such as by adding up the buys or sells and using a price somewhere between, inclusively, the prices at the times of each of the multiple filled orders). Likewise, one of skill in the art will understand that it is within the scope of the present invention that computations of allocations may take place in "real time," that is, immediately at or following time t, or that computations may take place at other times, such as by performing multiple "catch-up" allocation computations since the last allocation computation based on historical price and quantity data. For example, these "catch-up" allocation computations may be performed whenever a user or client or other authorized party requests that allocations for one or more managed accounts be revealed. Even when "real time" allocations are intended to be implemented, it will be understood that delays in determination of allocations may occur as a result of delays in providing an allocation processing apparatus with current price and quantity data or from computational delays in the processing apparatus itself, and that all such delays are still intended to be within the scope of this invention.

An important goal of the invention, consistent with the above understanding, is to calculate, at some time concurrent with or after time t, a fair and optimal allocation and/or net position for each of the N managed accounts at time t−1. This is because the filled order at time t−1 can have recognized profit and loss, while the filled order at time t cannot.

A number of formulas are shown in FIG. 4, such as may permit one of skill in the art to continuously determine current values of these variables from previous values of these variables. Additionally, FIG. 4 shows formulas which will permit one of skill in the art to calculate the "var" and "Q" values at particular times for particular portfolios and particular allocations. These values are particular metrics which may be used according to the invention to choose amongst a known set of possible allocations to the various managed accounts. However, it will be understood that other metrics may be used within the confines of the particular methods set out in this specification, and that such other metrics are within the scope of the invention.

Figure 4A:
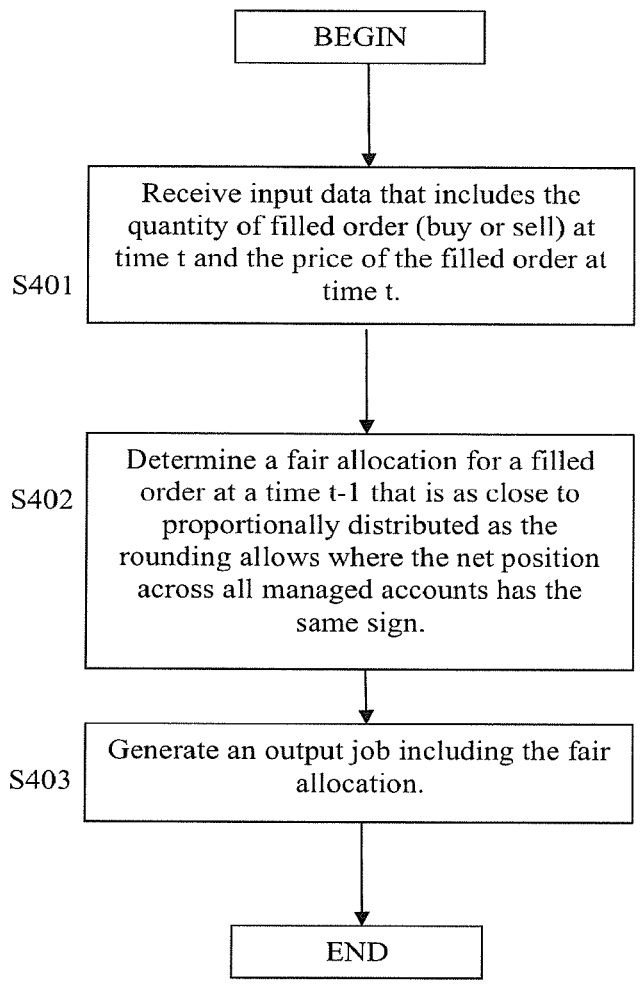
FIG. 4A shows a flow diagram of an embodiment of the present invention.

FIG. 4A is a flow diagram giving an overview of the process of the invention. It will be understood that at the beginning of performing the method at a particular time t, the computer system or device performing the method already has access to data such as the number of managed accounts for the portfolio; the managed accounts' respective allocation factors; and at least for a previous time t−1, the following additional information: i) the portfolio net position, ii) the various account's net positions, iii) the total cumulative (aggregated) realized profit and loss for the portfolio and the various managed accounts, and iv) the price of the financial asset (or contract) at issue.

At step S401, this computer system or device electronically receives, preferably over a computer network having access to streaming financial data or by manual input or by a scan of a document having such data, input data that includes at least the quantity of the filled order (and whether the filled order is a buy or a sell) at time t as well as the price of the filled order at this time t.

Then, at step S402, at least the price at time t from this input data is used in determining an allocation across the managed accounts. In an embodiment, the allocation is determined so as to necessarily be as close to proportionally distributed, according to a particular metric (Q or var or a combination thereof being nonlimiting examples of such metrics) as the available rounding (such as integer rounding in some exchanges) allows. In some embodiments, the allocation is determined so as to necessarily be as close to proportionally distributed of any possible allocation, while in other embodiments it is determined so as to necessarily be as close to proportionally distributed of any allocation chosen from a set of two or more candidate allocations. Methods of generating candidate allocations, and in particular a "perturbation" method, are discussed in more detail later in this specification. Preferably, the allocation is determined so that allocation and/or the net position across all managed accounts necessarily have the same sign (e.g., if buys are considered as positive numbers and sells as negative numbers, that all accounts are assigned an allocation and/or net position that is greater than or equal to zero, or alternately all accounts are assigned an allocation and/or net position that is less than or equal to zero). This prevents the managed accounts from buying or selling from one another.

Then, at step S403, the system or device generates an output job. As discussed above, the output job may be any of the variety of electronic actions that put the allocation to a beneficial use. By way of non-limiting example, the output may be printed or displayed on a screen of a client or account manager.

Figure 5A:
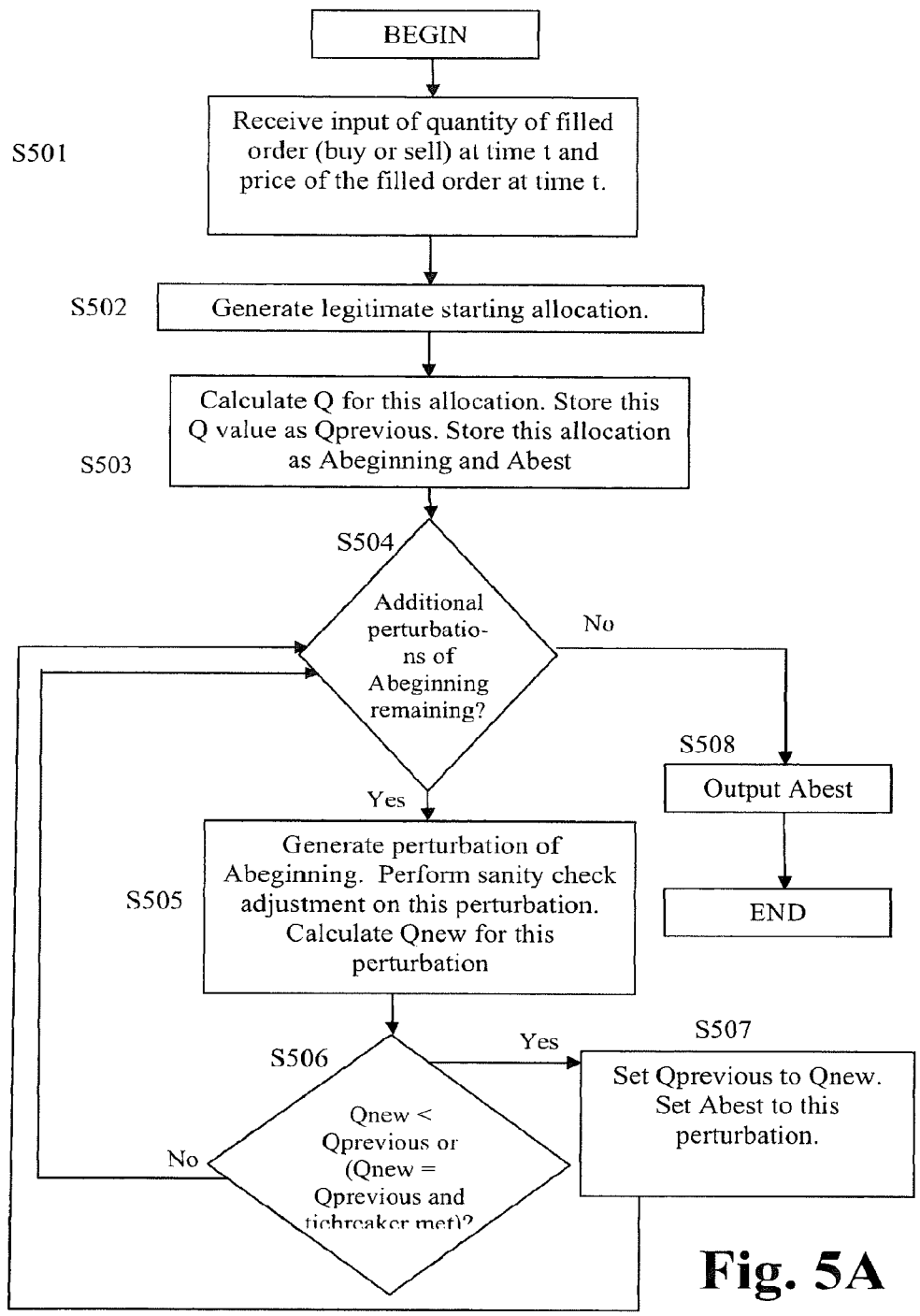
FIGS. 5A-5C shows a flow diagram of an embodiment of the present invention involving the generation of a legitimate starting allocation and the determination of a closest-fitting allocation from amongst this legitimate starting allocation and some number of perturbations of this legitimate starting allocation.
Figure 5B:
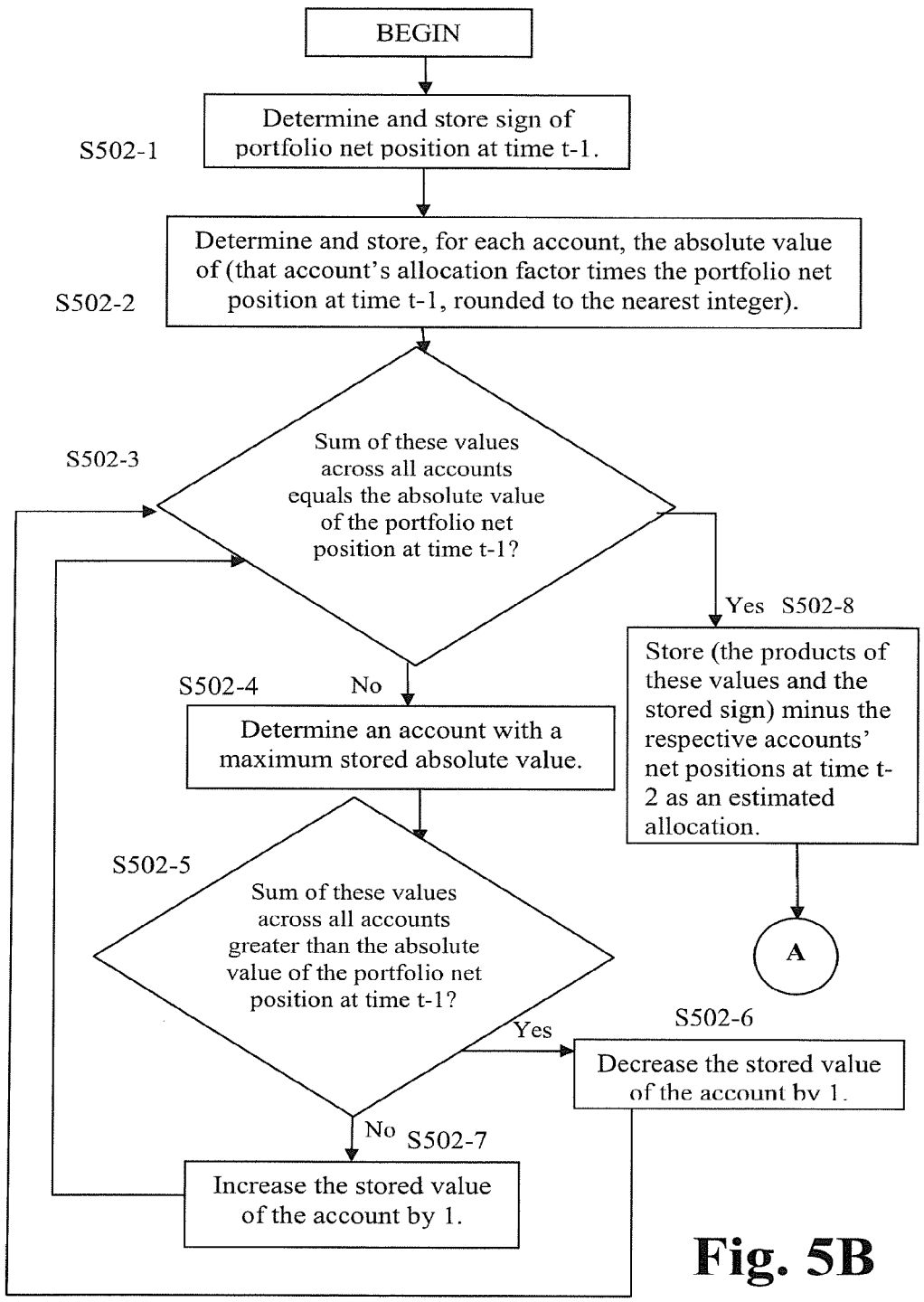
Figure 5C:
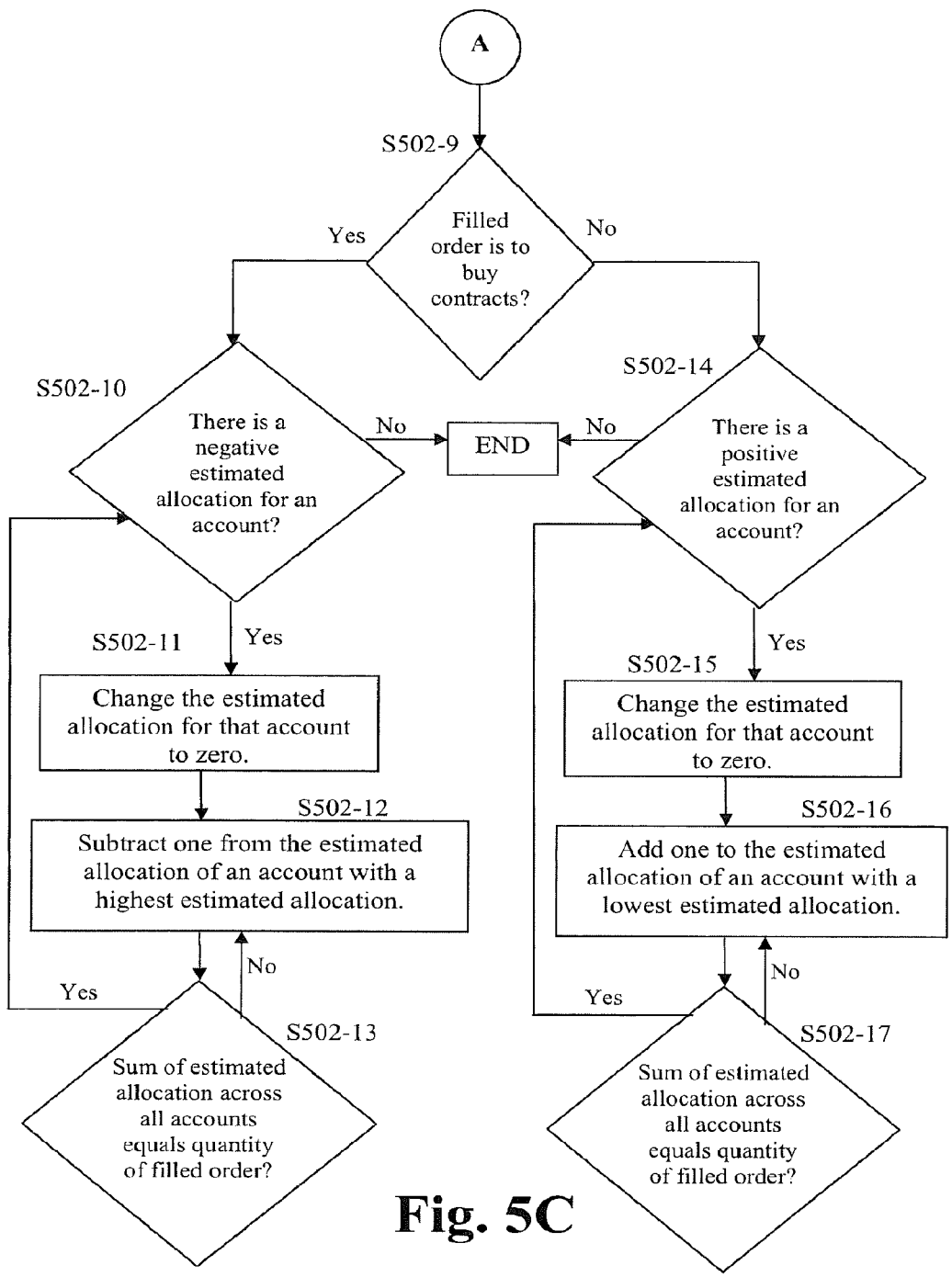

FIGS. 5A-5C show another method according the present invention which is also performed electronically with a computer system or device. The background data accessible by the computer system or device is similar to that discussed in connection with FIG. 4. S501 is similar to S401, and the discussion of S401 is applicable to S501.

After S501, S502 generates a legitimate starting allocation of the filled order amongst the various managed accounts. Preferably, the legitimate starting allocation satisfies several constraints: (i) the sum of the absolute values of the allocated values across all of the managed accounts should equal the absolute value of the filled order, and (ii) either all of the allocated values across the managed accounts should be buys (e.g. greater than or equal to zero) or they should all be sells (e.g. less than or equal to zero). Further, as will be discussed below, the legitimate starting allocation should preferably be generated so as to at least be "close" to an optimal allocation. That is, for the metric (e.g. Q) used, movements of a small number of allocated contracts amongst a small number (e.g. four or fewer) of managed accounts should be sufficient to transform the legitimate starting allocation to an optimal allocation according to that metric (so far as rounding allows).

A particular example of a method for the generation of a legitimate starting allocation as per S502 is shown in FIGS. 5B-5C. Pseudocode, such as will aid in the understanding of one of ordinary skill in the art of the portion of the method shown in FIG. 5B, and as will aid in implementation of this portion of the method, is given in FIG. 7. Pseudocode, such as will aid in the understanding of one of ordinary skill in the art of the portion of the method shown in FIG. 5C, and as will aid in implementation of this portion of the method, is given in FIG. 8.

At step S502-1 the sign of the portfolio net position at time t−1 is stored. If the net position at this time is flat, then the allocation will be flat as well (e.g., zeros for all accounts). Accordingly, the rest of the process need not be performed and the determination of the sign becomes irrelevant. Alternately, the process may simply be continued with either sign value being used. The sign value may be stored for example as a boolean value with true meaning positive/buy and false meaning negative/sell, or by such other methods as will be clear to one of ordinary skill in the art, such as an integer having a +1 value for buys and −1 value for sells.

Then at step S502-2 the portfolio net position at time t−1 is multiplied by each account's account allocation factor and this value is rounded, such as to the nearest integer. The absolute value of this result is taken and stored for each account. However, this process may result in the sum of the values for the managed accounts not equaling the value of the portfolio net position. Accordingly, a methodology is needed to correct this inequality. S502-3 through S502-7 provide such a methodology. However, in addition to this methodology any other method of correcting this inequality that maintains the constraints of the legitimate starting allocation discussed above is understood as being within the scope of this invention.

S502-3 is a check as to whether the sum of the individual managed account allocations equals the portfolio net position at time t−1. If this sum does equal the portfolio net position, then the correction is complete, and the computer or device performing the method then proceeds to step S502-8. Otherwise, it is necessary to increment or decrement some account's allocation (as per steps S502-4 through S502-6) and check again (as per another iteration of this step S502-3).

S502-4 determines an account with a highest stored absolute value. This may be performed by checking the value of each account, by pre-sorting and then examining the highest value, or by other known methods for determining a maximum. If multiple accounts have the same value, then any one of them may be chosen.

Then, S502-5 is a check as to whether the sum of the accounts' absolute values exceeds the absolute value of the portfolio net position at time t−1. However, it should be understood that that this calculation may be made at other times, such as at or immediately before or after the performance of step S502-3. If the check is positive, the account determined at S502-4 has its stored value decremented (as per S502-6). Otherwise (where the sum of the accounts' absolute values is less than the absolute value of the portfolio net position), the account determined at S502-4 has its value incremented (as per S502-7).

Once the check of S502-3 is satisfied, in S502-8 the computer or device stores the difference of: i) the products of the stored absolute values and the stored sign (with the stored sign understood here as +1 if positive and −1 if negative) and ii) these account's net positions at time t−2. This result may be understood as an estimated allocation across all of the managed accounts, and it may be stored as a vector of integers, or in any other known data structure as will be familiar to one of ordinary skill in the art.

To ensure that the estimated allocation has a value that is either greater than or equal to zero for all managed accounts or less than or equal to zero for all managed accounts, a further adjustment may be necessary. While all such adjustments will be understood as within the scope of the invention, FIG. 5C and its steps S502-9 through S502-17 shows a particular method for making the adjustment. Such a process of ensuring that this constraint is met is referred to a "sanity check adjustment" in this specification.

At step S502-9 a determination is made as to whether the filled order at time t−1 is to buy contracts (e.g. whether the change in the portfolio net position at time t−1 is considered as positive). If so, only steps S502-10 through S502-13 are used in the rest of the adjustment. Otherwise, the filled order must have been to sell contracts (e.g., the change in the portfolio net position at time t−1 must be negative), and only steps S502-14 through S502-17 are used in the rest of the adjustment.

At S502-10/S502-11 a check is performed to see whether there are any negative/positive allocations for at least one of the accounts. If not, then no (further) adjustment need be made, and the legitimate starting allocation has been generated, ending step S502. If there is such an allocation for at least one account, that account's allocation is changed to zero at S502-11/S502-15. Then, at S502-12 and S502-13/S502-16 and S502-17, one is continually subtracted from/added to the estimated allocation of the account with the highest/lowest estimated allocation, until the sum of the estimated allocations equals the quantity of filled order at time t−1. Then, the check at S502-10/S502-14 is again performed to see if any other accounts have a negative/positive estimated allocation. Once this process is complete, the legitimate allocation of step S502 has been generated.

Referring again to FIG. 5A, S503 calculates a Q value for the legitimate starting allocation generated at step S502, according to the formulas and definitions given in FIG. 4. However, it should be understood that other metrics could instead be used. By way of a simple non-limiting example, the exponent in the formula for calculating Q could be changed to another value other than 2, such as 1, 1.5, or 3 (with absolute value taken) to arrive at a formula for calculating some other metric (i.e. Q'). This calculated value is stored, and will be referred to in this specification as Qprevious. Qprevious is a variable that will hold whatever the closest-fitting, that is, lowest, value of Q is that has been found by the method. The legitimate starting allocation is stored both as Abeginning (where this particular value will remain through the performance of the method) and as Abest, which is a variable holding the closest-fitting allocation that has been found so far (that is, the allocation having the closest-fitting calculated value according to the corresponding metric).

Figure 6:
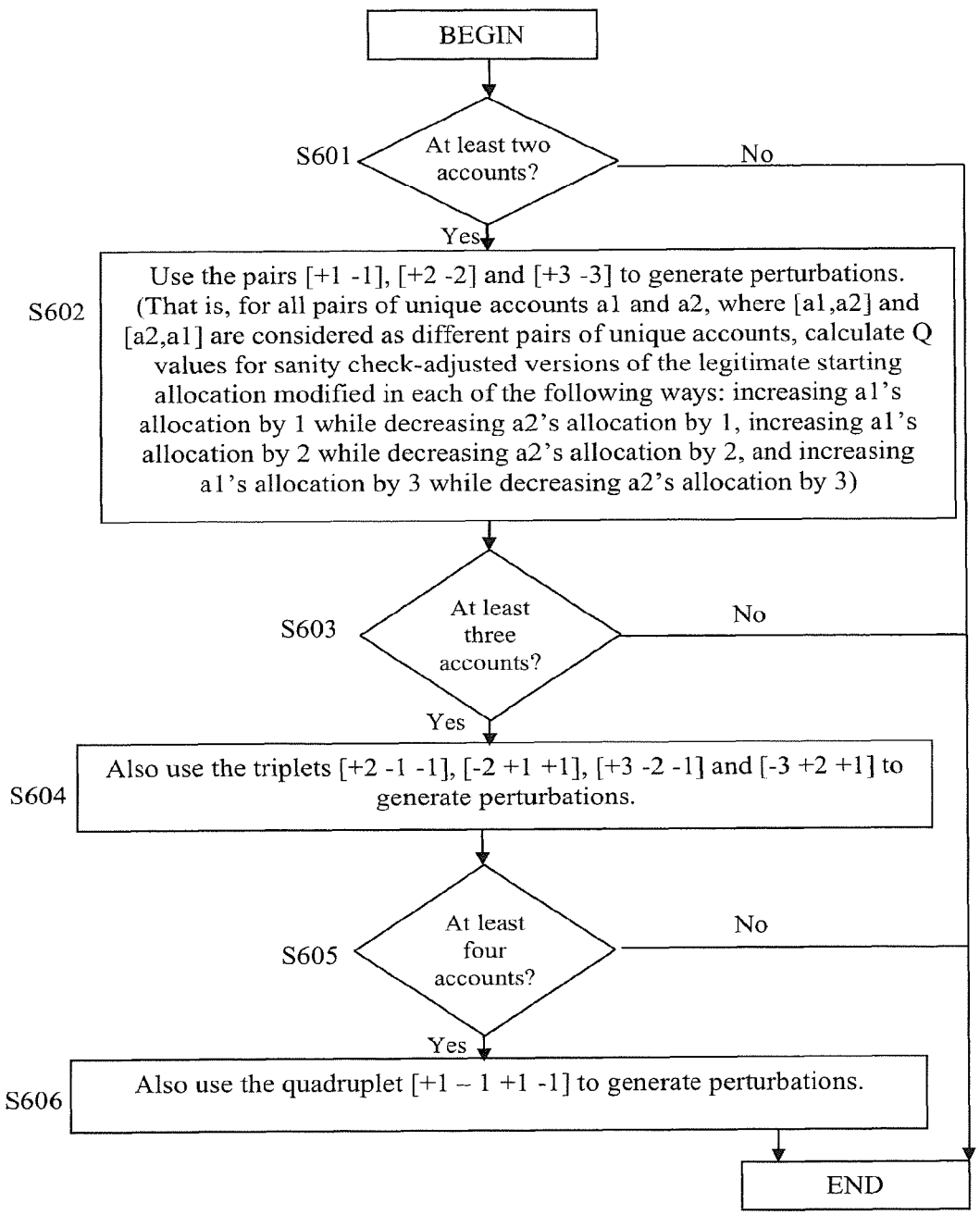
FIG. 6 shows a method of determining a particular set of perturbations such as may be used in the method of FIGS. 5A-5C.

At S504, a check is performed as to whether there are any additional perturbations of the legitimate starting allocation left to examine that have not yet been examined. Perturbations are variations of the legitimate starting allocation that maintain the sum of the allocated values across the managed accounts (which values it will be recalled equal the portfolio net position at time t−1), but result in certain accounts having a relatively larger allocation and certain accounts having a relatively smaller allocation. A particular methodology for generating the perturbations is shown at FIG. 6 and the accompanying discussion below. However, at this point in the discussion, it suffices to say that all of these perturbations will be examined to determine the one that is most optimal according to the metric.

Assuming that not all perturbations have yet been generated and examined, then, at S505 one such perturbation is generated. The "sanity check adjustment" of FIG. 5C is performed on this perturbation, to make sure that it does not violate the constraint that the allocations across all accounts should all be non-negative or all be non-positive. A Q value (or whatever other metric is in use) is then calculated for this (possibly adjusted) perturbation, which will be referred to as Qnew.

At S506, a check is performed to see if Qnew is better than, that is, less than, Qprevious. If so, the perturbation is preferable to the legitimate starting allocation or any previously examined perturbation. Also, even if Qnew is the same as Qprevious, if a tiebreaker condition is met, (by way of non-limiting example, if the var value that would result from the current perturbation, as compared to that which would result from the previously found closest-fitting allocation Abest, is lower) then the perturbation may likewise be considered preferable.

If the new perturbation is considered preferable, then this is registered in the computer or device, as per S507 where Qprevious is set to equal the Qnew value, and Abest is set to the new and preferable perturbation. It will be understood that FIG. 5a discloses that each potential perturbation is generated and scored, as per steps S505-S506. At step S508, a determined most preferable allocation (chosen from amongst the legitimate starting allocation and all of the perturbations thereof) Abest is electronically put to some beneficial use, as discussed above in connection with outputting and/or generating an output job.

FIG. 6 shows a method of generating perturbations, that is, a number of possible allocations which may be examined to determine whether they are better than the legitimate starting allocation and better than the other perturbations. It should be noted, as discussed above, that a "sanity check adjustment" is preferably performed on the generated perturbations to ensure that they will meet the all non-negative/all non-positive constraint. In at least one embodiment of the present invention, as shown, perturbations are generated from particular pairs, triplets, and quadruplets, depending upon the number of managed accounts. As shown in steps S601-S602, a set of pairs is used to generate perturbations as long as there are at least two accounts. In particular, the set of pairs [+1 −1] [+2 −2] [+3 −3] are used to generate perturbations. The manner of doing for each of these pairs [x y], is, for all pairs of unique accounts a1 and a2, take the legitimate starting allocation (which for example in S503 is stored as Abeginning) and add x to a1's value in that allocation and add y to a2's value in that allocation. As a simple example, if the legitimate starting allocation amongst two accounts is [4 8], and the suggested set of pairs [+1 −1] [+2 −2] [+3 −3] are used, the following perturbations will be generated: [5 7] [6 6] [7 5] [3 9] [2 10] and [1 11].

As shown in S603 and S604, in addition to the pairs used to generate perturbations, a set of triplets are also used to generate perturbations when there are at least three managed accounts. This may be done in the same manner. [+2 −1 −1] [−2 +1 +1] [+3 −2 −1] [−3 +2 +1] are a suggested set of triplets.

As shown in S605 and S606, in addition to the pairs and triplets used to generate allocations, a set of quadruplets are also used to generate perturbations when there are at least four managed accounts. This may be done in the same manner. [+1 −1 +1 −1] is a suggested set of quadruplets.

The use of these pairs, triplets and quadruplets to generate perturbations has an advantage over a brute force approach of checking all possible allocations of the filled order, in that the time for generating and examining these perturbations is orders of magnitude less than would be required for a brute force approach. The method of FIG. 6 may be understood as a grid search in a narrow range for each filled order. Even as the number of managed accounts N grows arbitrarily large, the total number of perturbations examined is only $\theta(N^4)$. It should be noted that preferably, where N is at least 3, both the set of pairs and the set of triplets are used to generate perturbations, and where N is at least 4, all of the set of pairs and the set of triplets and the set of quadruplets are used to generate perturbations.

Pseudocode, such as will aid in the understanding of one of ordinary skill in the art of the portions of the method shown in FIG. 6 and in S504-S507 of FIG. 5, and as will aid in implementation of this portion of the method, is given in FIGS. 9A-9C. It will be understood that with respect to the disclosure of each of the pseudocode figures, one of ordinary skill in the art will be able to implement such pseudocode according to the spirit of the invention in a variety of ways in any of a variety of different programming languages or software applications, and that such pseudocode is merely exemplary, and that a large number of equivalent computerized implementation methods are all within the scope of applicants' invention.

According to one embodiment of the present invention, a computer-implemented method is provided for providing an allocation of a filled order made at a time t−1, involving: receiving at least a price of a filled order made at a time t; generating a starting allocation across multiple managed accounts based at least in part on allocation factors of each of the multiple managed accounts; generating at least one additional allocation based at least in part on the starting allocation; determining a closest-fitting allocation according to a metric from amongst the starting allocation and the at least one additional allocation, the metric being based at least in part on the price of the filled order made at the time t and on a price of the filled order made at the time t−1; and outputting the closest-fitting allocation.

In a further embodiment, the multiple managed accounts comprise at least two accounts; and the at least one additional allocation include, for each member of a set of non-zero integer pairs, a perturbation of the starting allocation for each unique pair of managed accounts amongst the multiple managed accounts that is based at least in part on adding to allocated integer values of the starting allocation associated with both members of the unique pair, an integer value associated with a corresponding non-zero integer value of the member of the set of non-zero integer pairs. The set of non-zero integer pairs may include [+1 −1], [+2 −2], and [+3 −3].

In yet a further embodiment, the multiple managed accounts include at least three accounts; and the at least one additional allocation further includes, for each member of a set of non-zero integer triplets, a perturbation of the starting allocation for each unique triplet of managed accounts amongst the multiple managed accounts that is based at least in part on adding to allocated integer values of the starting allocation associated with all three members of the unique triplet, an integer value associated with a corresponding non-zero integer value of the member of the set of non-zero integer triplets. The set of non-zero integer triplets may include [+2 −1 −1], [−2 +1 +1], [+3 −2 −1] and [−3 +2 +1].

In an additional embodiment, the multiple managed accounts include at least four accounts; and the at least one additional allocation further includes, for each member of a set of non-zero integer quadruplets, a perturbation of the starting allocation for each unique quadruplet of managed accounts amongst the multiple managed accounts that is based at least in part on adding to allocated integer values of the starting allocation associated with all four members of the unique quadruplet, an integer value associated with a corresponding non-zero integer value of the member of the set of non-zero integer quadruplets. The set of non-zero integer quadruplets may include [+1 −1 +1 −1]. The set of non-zero integer pairs may include [+1 −1], [+2 −2], and [+3 −3] and the set of non-zero integer triplets may include [+2 −1 −1], [−2 +1 +1], [+3 −2 −1] and [−3 +2 +1]. These three sets optionally may include no further *members*.

In yet another further embodiment, the at least one additional allocation may include $\theta(N^4)$ additional allocations, with N being defined in FIG. 4 as the number of managed accounts and this bound applying as N grows.

In another embodiment, the generating of the at least one additional allocation is further based on a determination of whether the perturbation contains a negative allocation when the filled order made at the time t−1 is to buy contracts or a positive allocation when the filled order made at the time t−1 is to sell contracts, and, if so, an adjustment is made to the perturbation that ensures that the at least one additional allocation does not contain a negative allocation when the filled order made at the time t−1 is to buy contracts or a positive allocation when the filled order made at the time t−1 is to sell contracts. The adjustment may include changing the negative allocation to zero and iteratively subtracting one from an allocation of an account with a highest allocation until a sum of allocations across all of the multiple managed accounts equals a quantity of the filled order made at the time t−1. The adjustment may include changing the positive allocation to zero and iteratively adding one to an allocation of an account with a lowest allocation until a sum of allocations across all of the multiple managed accounts equals a quantity of the filled order made at the time t−1.

In one more embodiment, the metric is based on closeness of the starting allocation and the at least one additional allocation to a desired division of profit and loss according to the allocation factors of each of the multiple managed accounts; and the closest-fitting allocation is guaranteed to be preferable or equivalent to any possible allocation of the filled order made at a time t−1 according to the metric. The metric may be the minimization of Q. The metric may further apply a preference, in the event that allocations have equal Q values, to pick an allocation that has a smallest var(NPt) amongst the allocations having equal Q values.

In yet another embodiment, generating the starting allocation may include the steps of: rounding to the nearest integer, for each of the multiple managed accounts, a product of the managed account's allocation factor and a portfolio net position at time t−1; determining whether the sum of absolute values of the rounded products equals the absolute value of the portfolio net position at time t−1; and if the sum of absolute values of the rounded products does not equal the absolute value of the portfolio net position at time t−1, performing an adjustment to the rounded products such that the sum of absolute values of the rounded products equals the absolute value of the portfolio net position at time t−1. The adjustment may include iteratively performing, until the sum of the absolute values of the rounded products equals the absolute value of the portfolio net position at time t−1, the steps of: determining a particular managed account whose associated rounded product has a maximum absolute value; determining whether the sum of the absolute values of the rounded products is greater than the absolute value of the portfolio net position at time t−1; if so, incrementing or decrementing the associated rounded product of the particular managed account such that its absolute value is decreased by one; and otherwise, incrementing or decrementing the associated rounded product of the particular managed account such that its absolute value is increased by one. The starting allocation, for each of the multiple managed accounts, may equal the difference between an absolute value of an associated rounded product of that account multiplied by a sign of the portfolio net position at time t−1 and that account's net position at time t−2.

In one more embodiment, a computer-implemented method is provided for providing an allocation of a filled order made at a time t−1, including: receiving, in an allocation processing apparatus, at least a price of a filled order made at a time t; generating, in the allocation processing apparatus, a starting allocation across multiple managed accounts based at least in part on allocation factors of each of the multiple managed accounts; generating, in the allocation processing apparatus, at least one additional allocation based at least in part on the starting allocation; determining, in the allocation processing apparatus, a closest-fitting allocation according to a metric from amongst the starting allocation and the at least one additional allocation, the metric being based at least in part on the price of the filled order made at the time t and on a price of the filled order made at the time t−1; and outputting, using an output part of the allocation processing apparatus, the closest-fitting allocation. It will be understood that all of the above-mentioned embodiments are compatible with this embodiment and such combinations provide a part of the invention.

It will be further understood that each of the steps in each of the present methods is preferably implemented on a digital computer. While Applicants' invention has been particularly shown and described as referenced to the embodiments thereof, those skilled in the relevant art will understand that changes in form and detail may be made to these embodiments without departing from the spirit and scope of the invention.

What is claimed is:

1. A method comprising:
   determining, by a computer, an allocation of one or more contracts associated with a transaction across a plurality of separate accounts based on a cumulative profit and loss value for the plurality of separate accounts for a pre-determined period of time, wherein the transaction includes a buy or a sell;
   determining one or more candidate allocations by modifying the allocation, wherein the modifying of the allocation includes adjusting one or more allocated values of the one or more contracts for the plurality of separate accounts; and
   selecting one of the one or more candidate allocations that fairly distributes one or more returns across the plurality of separate accounts for the pre-determined period of time,
   wherein the fair distribution is based on minimizing a summation, Q, represented as follows:

$$Q = \sum_{i=1}^{N} \left( \frac{PL_t^i}{\alpha_i} - PL_t \right)^2,$$

where
   $PL_t^i$ represents account i cumulative realized profit and loss at time t,
   $PL_t$ represents total cumulative realized profit and loss at time t,
   N represents number of the accounts, and
   $\alpha_i$ represents a corresponding one of a plurality of allocation factors for account i.

2. The method of claim 1, wherein the one or more allocated values are adjusted by a whole number to equalize the one or more returns across the plurality of separate accounts.

3. The method of claim 1, wherein the one or more candidate allocations are determined based on one or more perturbation vectors that include one or more doublets, one or more triplets, or one or more quadruplets.

4. The method of claim 1, further comprising:
   updating the cumulative profit and loss value for each of the one or more candidate allocations; and
   determining the one or more returns across the plurality of separate accounts based on the updated cumulative profit and loss value.

5. The method of claim 1, wherein the transaction of the one or more contracts, at a level of a totality of the accounts, causes the one or more allocated values for the plurality of the accounts to become zero or a positive number when the transaction is a buy transaction or causes the one or more allocated values for the plurality of the accounts to become zero or a negative number when the transaction is a sell transaction.

6. The method of claim 1, wherein the one or more allocated values for the plurality of the accounts become zero when an aggregated value for the one or more contracts, at a level of a totality of the accounts, becomes zero.

7. The method of claim 1, wherein all of the one or more allocated values are increased when the one or more contracts are purchased from a buy transaction and decreased when the one or more contracts are sold from a sell transaction.

8. The method of claim 1, further comprising:
   determining a starting allocation of the one or more contracts for the plurality of separate accounts based on one or more of the allocation factors,
   wherein the one or more allocated values have a same sign and one or more whole numbers, and the one or more allocated values accumulate to an amount of the one or more contracts purchased or sold from a buy transaction or a sell transaction.

9. The method of claim 1, further comprising:
   calculating a profit and loss value for each of the plurality of separate accounts for the pre-determined period of time;

calculating a return value for each of the plurality of separate accounts based on the profit and loss value;

comparing the return value for one of the plurality of separate accounts against the return value for one or more others of the plurality of separate accounts and a total return value for a totality of the accounts; and adjusting the one or more allocated values based on the comparing to equalize the return value for each of the plurality of separate accounts.

10. The method of claim 9, wherein the adjusted allocated values are determined based on a measurement of a deviation from the cumulative profit and loss value or a cumulative return value of the totality of the accounts for the pre-determined period of time.

11. The method of claim 9, wherein the adjustment is made to the one or more allocated values such that the one or more allocated values become zero or a positive number when the one or more contracts are purchased from a buy transaction and the one or more allocated values become zero or a negative number when the one or more contracts are sold from a sell transaction.

12. A non-transitory computer-readable storage medium carrying one or more sequences of one or more instructions which, when executed by computer, cause the computer to at least perform the following steps:

determining an allocation of one or more contracts associated with a transaction across a plurality of separate accounts based on a cumulative profit and loss value for the plurality of separate accounts for a pre-determined period of time, wherein the transaction includes a buy or a sell;

determining one or more candidate allocations by modifying the allocation, wherein the modifying of the allocation includes adjusting one or more allocated values of the one or more contracts for the plurality of separate accounts; and selecting one of the one or more candidate allocations that fairly distributes one or more returns across the plurality of separate accounts for the pre-determined period of time, wherein the fair distribution is based on minimizing a summation, Q, represented as follows:

$$Q = \sum_{i=1}^{N} \left( \frac{PL_t^i}{\alpha_i} - PL_t \right)^2,$$

where $PL_t^i$ represents account i cumulative realized profit and loss at time t, $PL_t$ represents total cumulative realized profit and loss at time t, N represents number of the accounts, and $\alpha_i$ represents a corresponding one of a plurality of allocation factors for account i.

13. The non-transitory computer readable storage medium of claim 12, wherein the one or more allocated values are adjusted by a whole number to equalize the one or more returns across the plurality of separate accounts.

14. The non-transitory computer readable storage medium of claim 12, wherein the one or more candidate allocations are determined based on one or more perturbation vectors that include one or more doublets, one or more triplets, or one or more quadruplets.

15. The non-transitory computer readable storage medium of claim 12, wherein the computer is further caused to perform the following:

updating the cumulative profit and loss value for each of the one or more candidate allocations; and determining the one or more returns across the plurality of separate accounts based on the updated cumulative profit and loss value.

16. The non-transitory computer readable storage medium of claim 12, wherein the transaction of the one or more contracts, at a level of a totality of the accounts, causes the one or more allocated values for the plurality of the accounts to become zero or a positive number when the transaction is a buy transaction or causes the one or more allocated values for the plurality of the accounts to become zero or a negative number when the transaction is a sell transaction.

17. The non-transitory computer readable storage medium of claim 12, wherein the one or more allocated values for the plurality of the accounts become zero when an aggregated value for the one or more contracts, at a level of a totality of the accounts, becomes zero.

18. The non-transitory computer readable storage medium of claim 12, wherein all of the one or more allocated values are increased when the one or more contracts are purchased from a buy transaction and decreased when the one or more contracts are sold from a sell transaction.

19. The non-transitory computer readable storage medium of claim 12, wherein the computer is further caused to perform the following:

determining a starting allocation of the one or more contracts for the plurality of separate accounts based on one or more of the allocation factors, wherein the one or more allocated values have a same sign and one or more whole numbers, and the one or more allocated values accumulate to an amount of the one or more contracts purchased or sold from a buy transaction or a sell transaction.

20. The non-transitory computer readable storage medium of claim 12, wherein the computer is further caused to perform the following:

calculating a profit and loss value for each of the plurality of separate for the pre-determined period of time;

calculating a return value for each of the plurality of separate accounts based on the profit and loss value;

comparing the return value for one of the plurality of separate accounts against the return value for one or more others of the plurality of separate accounts and a total return value for a totality of the accounts; and adjusting the one or more allocated values based on the comparing to equalize the return value for each of the plurality of separate accounts.

21. The non-transitory computer readable storage medium of claim 12, wherein the adjusted allocated values are determined based on a measurement of a deviation from the cumulative profit and loss value or a cumulative return value of the totality of the accounts for the pre-determined period of time.

22. The non-transitory computer readable storage medium of claim 12, wherein the adjustment is made to the one or more allocated values such that the one or more allocated values become zero or a positive number when the one or more contracts are purchased from a buy transaction and the one or more allocated values become zero or a negative number when the one or more contracts are sold from a sell transaction.

* * * * *